July 26, 1927.

H. PERROT 1,637,089

FRONT WHEEL MOUNTING

Filed Aug. 25, 1922

Inventor
H. Perrot
By Marker Clark
Attys

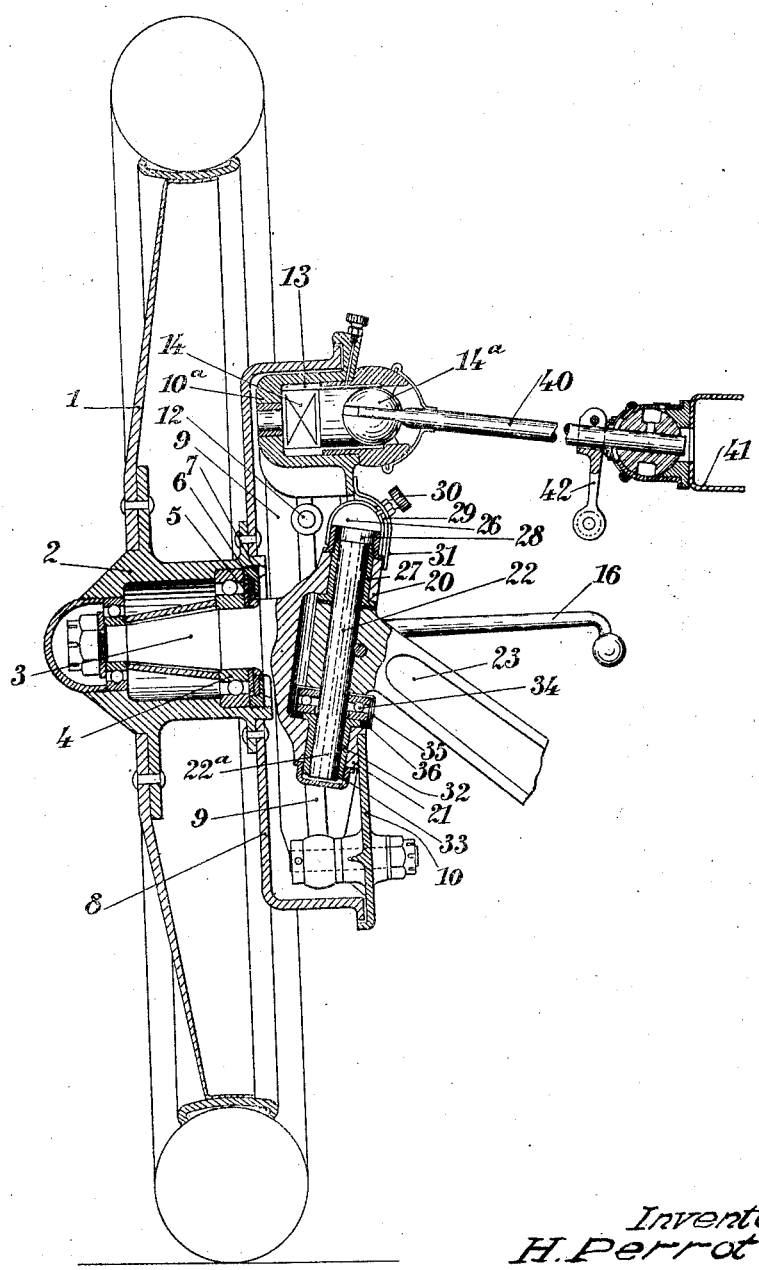

July 26, 1927.　　　　　　H. PERROT　　　　　　1,637,089
FRONT WHEEL MOUNTING
Filed Aug. 25, 1922　　　　3 Sheets-Sheet 3
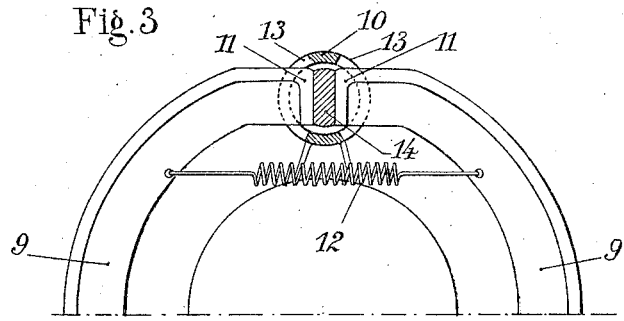
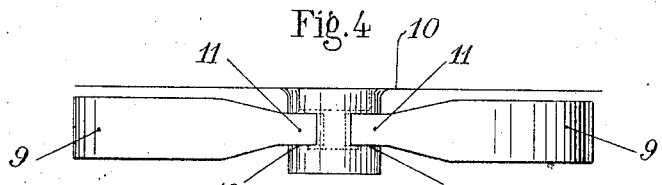
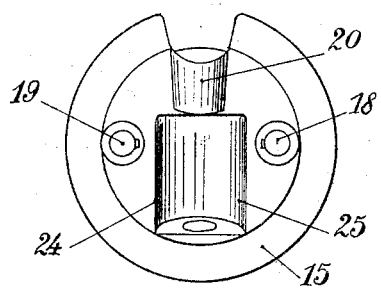
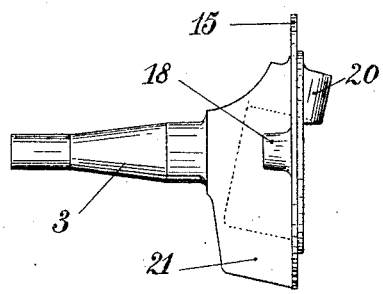
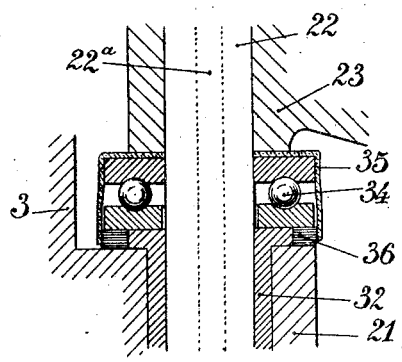
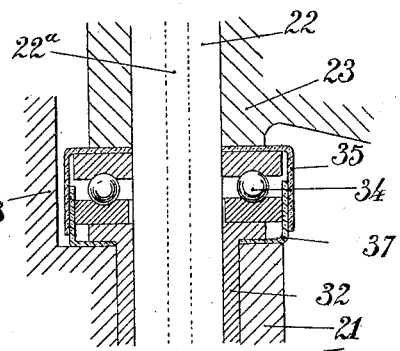
Inventor
H. Perrot
By Marker Clark
Attys Patented July 26, 1927.

1,637,089

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

FRONT-WHEEL MOUNTING.

Application filed August 25, 1922, Serial No. 584,324, and in France December 7, 1921.

This invention relates to front wheel mountings for motor cars and the object of the invention is to provide improved means for mounting the steering spindle of the wheel so that it may be lubricated from the exterior of the mounting.

Another object of the invention is to prevent the oil for the wheel hub from entering the brake casing of the steering wheel.

Still another object of the invention is to prevent the wheel from becoming completely detached in case of accident.

The annexed drawings given by way of example, represent an embodiment of said improvements. In these drawings:

Fig. 2 is a vertical section of the wheel and brake,

Figure 3 is a view of a portion of the brake members, the operating cam being shown in section;

Fig. 4 is a top plan view of the parts shown in Fig. 3.

Fig. 5 is a side view of the steering spindle.

Fig. 6 is a side view thereof,

Fig. 7 is a detail view of the protecting means for the steering spindle,

Fig. 8 shows a modification of the construction shown in Figure 7.

The same reference characters are used throughout the description and the drawing for designating similar pieces.

Figure 1:
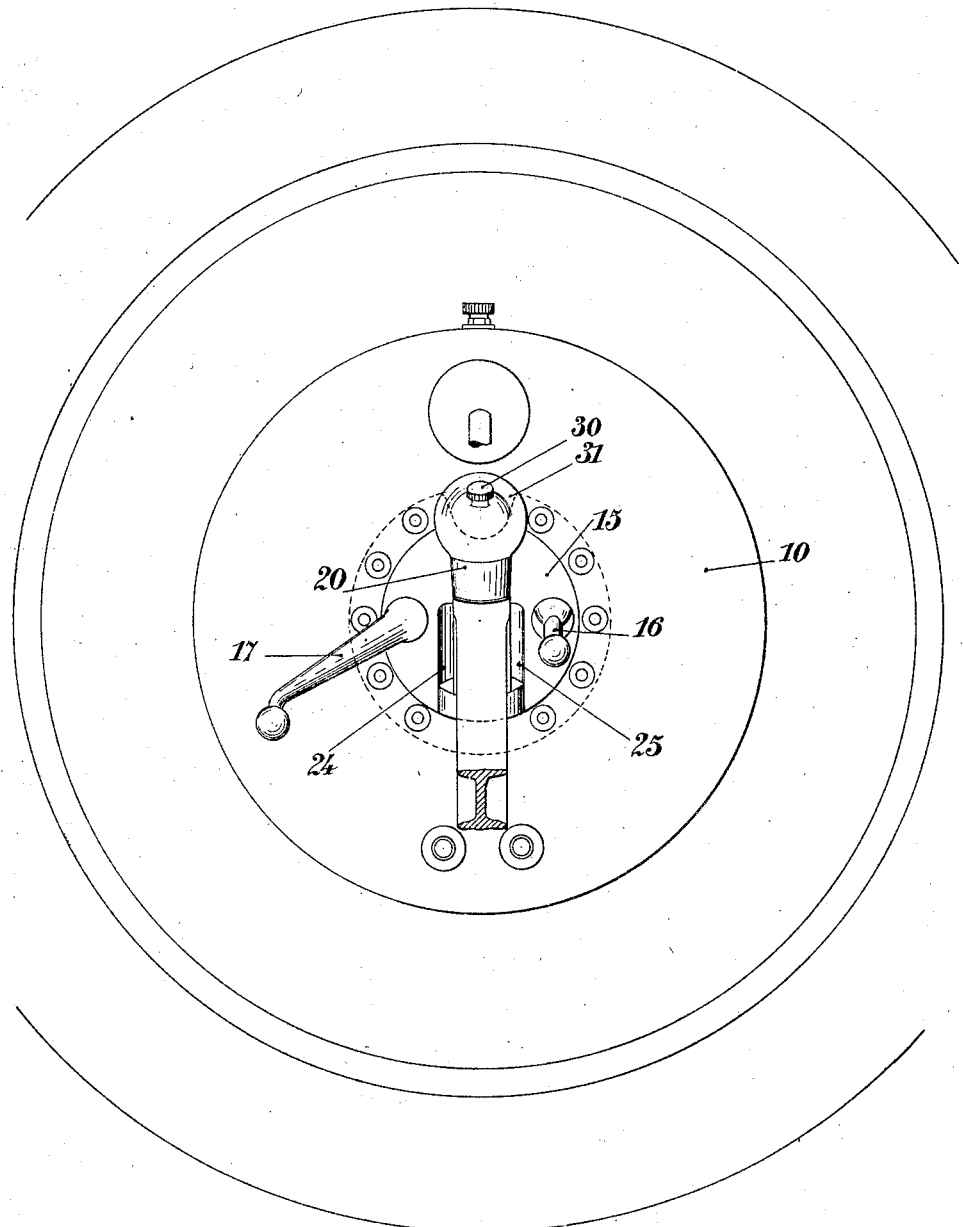
Fig. 1 is an elevation of the brake mounted on a wheel.

As shown in the drawing, the wheel spindle 3 is provided with a disc 15 stamped or cast integral therewith. This disc is provided with two projections 18 and 19 (Figs. 5 and 6) carrying the levers 16 and 17 (Fig. 1) which serve for steering and for securing the rods connecting both wheels; while at the same time, the said disc serves to reinforce the bosses 20 and 21 (Fig. 2) which are the bearings of the spindle 22 of the front axle 23, and one of which acts also at 24 and 25 (Fig. 5) as a stop-piece for the turning of the wheels. The said disc is thus given several functions which are ordinarily performed by different elements. Moreover, it will be noted that the wheel spindle is of symmetrical construction, so that it may be used as well for the left as for the right hand wheel.

The disc 10 which is the support for the brake segments 9 is secured to the disc 15 while the brake drum 8 is secured to the hub 2. By this disposition the steering spindle is located within the brake housing and is not seen from the exterior. A cylindrical and hollow boss 10$^a$ (Fig. 2) is provided on the disc 10 and contains and supports the brake cam 14. The latter is thus held at both ends, on the one hand by the boss 10$^a$ and on the other hand by the universal joint 14$^a$; at the same time, the said cam is laterally maintained in a position which is determined by the extremities 11 of the brake segments 9 which are always in contact therewith under the action of the segments' return spring 12 (Fig. 3). The extremities of the segments are caused to pass through two slits 13 provided in the boss 10$^a$ (Fig. 2) in front of the active portion of the cam, said slits thus serving as guides for the segments. The mounting of this device is rapid while the device itself is strong and economical. The cam is actuated by the actuating rod 40 jointed at one end to said cam by the universal joint 14$^a$ and at the other end to the frame 41 of the car by a universal telescopic joint. A lever 42 is keyed on said actuating rod 40 and operated by a pedal which may be actuated by the driver.

The steering spindle 22, inclined with respect to the wheel spindle is here completely cylindrical and is mounted in two symmetrical and very long bushings. A ball thrust bearing 34 or a smooth bearing supports load between the wheel spindle 3 and the front axle 23. This thrust bearing is completely protected from the outside by means shown by way of example in Figs. 7 and 8. In Fig. 7, a cup 35 made of metal or other material is secured to one of the parts of the ball thrust bearing, while a tight joint 36 for instance made of cork, is secured to the other part. In Fig. 8, the cup 35 secured to the one part covers another similar cup 37 secured to the other part without preventing the rotation of one part with respect to the other as both cups are adapted to rub slightly upon each other along their contact surface. These joints have for their object to ensure the lubrication of the pivoting members while preventing any escape of oil.

Moreover, it is to be noted that, the bushings 27 and 32 having the same diameter since the spindle 22 is cylindrical, it will be easy to introduce a tool for truing the contact surfaces through the whole pivot, whereby a perfect adjustment and an economical mounting are obtained.

The lubrication of the pivot may be effected from the exterior without reducing the tightness of the brake housing. A cap 26 (Fig. 2) is pivotally mounted on a special piece 28 secured to the upper bushing 27 of the steering spindle and is provided with a boss 29 supporting the oiler 30. The latter is disposed exteriorly, a cover 31 being arranged between said oiler and the cap 26; said cover 31 closes then the single non-tight part of the brake housing while providing access from the exterior for the oiling. The oil introduced at 30 descends through the axial conduit 22ª of the spindle 22 and is stopped at the lower part of the bushing 32 by the plug 33; by this means said oil may only come upwards between the bushings and the spindle 22; a certain portion of oil escapes and lubricates the ball thrust bearing 34 but is stopped by the joint formed by the cup 35 and the packing 36. It will be seen that there is a constant oil reserve in the pivot.

Lastly, a special mounting of the stuffing box of the hub 2 of the wheel 1 on the spindle 3 prevents any escape of oil towards the brakes and ensures a complete security as the wheel cannot be detached from the spindle in case of accident. The stuffing box (Fig. 2) comprises three parts: a ring 7 which permits the clamping of the ball bearing 4 from the outside, is screwed on the hub 2 of the wheel 1. A washer 5 is held between the bearing 4 and the spindle 3, while a packing 6 made of cork or other like material is disposed between the washer 5 and the ring 7. Said packing 6 having large contact surfaces constitutes a tight joint. If a rupture of the ball bearings should occur, the wheel will still be maintained on the spindle 3 as the side cheek of the ring 7 secured to the hub 2 will be held by the washer 5 secured to the spindle 3.

Having now described my invention, what I claim as new and desire to secure by Letters Patent is:

1. In a front wheel for motor vehicle, the combination of a wheel spindle, a disc provided on said wheel spindle, two symmetrical bosses on said disc and provided with long inner bushings having the same inner diameter, a cylindrical steering spindle rotatably mounted in said bushings, a tight plug on the lower part of the lower bushing, a thrust bearing upon the said lower bushing and means comprising a disc constituting in combination with said first named disc a tight casing around said thrust bearing and a brake housing, said last disc having an opening leading to the upper bushing, a cap pivotally mounted on the upper bushing, an oiler secured to said cap, a cover arranged between said oiler and said cap and closing the opening and an axial conduit in said steering spindle and connecting the inside of said cap with the inside of the said plug.

2. In a front wheel for motor vehicle, the combination of a wheel spindle, a disc provided on said wheel spindle, two symmetrical bosses on said disc and provided with long inner bushings having the same inner diameter, a cylindrical steering spindle rotatably mounted in said bushings, a tight plug on the lower part of the lower bushing, a thrust bearing upon the said lower bushing, a first cup secured to the one part of the said thrust bearing, a second cup secured to the other part of the said thrust bearing and having its rims overlapping the rims of the said first cup, a cap pivotally mounted on the upper bushing, an oiler secured to said cap, and an axial conduit in said steering spindle and connecting the inside of said cap with the inside of the said plug.

3. In a front wheel for motor vehicles, the combination of a wheel spindle, a disc on said spindle, two bosses on the disc so positioned as to receive the end of an axle therebetween, bearing bushings in said bosses, a hollow steering spindle passing through said bushings, a thrust bearing upon the lower bushing and a tight plug on the lower part of this bushing, a cap pivotally mounted on the upper bushing, an oiler carried by the cap, another disc secured to the first disc and forming therewith a brake housing, said second disc fitting around the cap on said upper bushing and a cover arranged between said oiler and cap and extending over a part of the second disc for completing the housing for the brakes.

4. In a front wheel for motor vehicles, the combination of a wheel spindle, a disc on said spindle, two vertically aligned bosses on said disc providing bearings, a steering spindle rotatably mounted in said bearings, and two vertically aligned projections on said disc, said steering spindle passing through a part of the vehicle axle, said bosses having portions thereon serving as stop pieces for the wheel and said projections acting as attachment points for the steering drag link and the cross tie rod to the other front wheel said bosses and said projections being symmetrically arranged on said disc.

5. In a front wheel for motor vehicles, the combination of a wheel spindle, a disc on said spindle, two bosses on the disc so positioned as to receive the end of an axle therebetween, bearing bushings in said bosses, a steering spindle positioned in said bushings and provided with a lubricant passage from one bushing to the other, a thrust bearing upon the lower bushing, a second disc attached to said first named disc and forming therewith a substantially fluid-tight brake housing, and a tight plug on the lower part of this bushing and extending through said second named disc, a cap pivotally mounted on the upper bushing, an oiler carried by the cap and a cover between the oiler and cap for closing the single non-tight part of the brake housing.

In testimony whereof I have signed my name to this specification.

HENRI PERROT.